United States Patent [19]

Waddill et al.

[11] Patent Number: 5,189,118
[45] Date of Patent: Feb. 23, 1993

[54] MIXTURES OF 1-ISOPROPYL-2-ARYL IMIDAZOLE AND 1-ISOPROPYL-2-ARYL IMIDAZOLINE AS EPOXY RESIN CURATIVES

[75] Inventors: Harold G. Waddill; Wei-Yang Su; George P. Speranza, all of Austin, Tex.

[73] Assignee: Texaco Chemical Company, White Plains, N.Y.

[21] Appl. No.: 662,142

[22] Filed: Feb. 28, 1991

[51] Int. Cl.$^5$ ............... C08G 59/44; C08G 59/50
[52] U.S. Cl. ........................... 525/504; 528/94; 528/117; 528/407
[58] Field of Search .............. 528/94, 117, 407; 525/504

[56] References Cited

U.S. PATENT DOCUMENTS

| | | | |
|---|---|---|---|
| 2,847,417 | 8/1958 | Erner | 260/309 |
| 3,037,028 | 5/1962 | Green | 260/309 |
| 3,225,200 | 6/1966 | Green | 260/309 |
| 3,715,365 | 2/1973 | Schulze | 260/309 |
| 4,060,655 | 11/1977 | Johannes et al. | 428/35 |
| 4,340,744 | 7/1982 | Schwartz et al. | 548/346 |
| 4,409,389 | 10/1983 | Bellas et al. | 548/342 |
| 4,436,892 | 3/1984 | Zondler et al. | 528/117 |
| 4,732,962 | 3/1988 | Atkins et al. | 528/94 |
| 4,826,991 | 5/1989 | Sawa et al. | 528/94 |
| 4,921,969 | 5/1990 | Su et al. | 548/335 |
| 4,927,942 | 5/1990 | Speranza et al. | 548/335 |
| 4,931,528 | 6/1990 | Waddill et al. | 528/94 |

FOREIGN PATENT DOCUMENTS

| | | |
|---|---|---|
| 0000418 | 1/1979 | European Pat. Off. . |
| 62100518 | 10/1985 | Japan . |
| 63-308030A | 12/1988 | Japan . |

OTHER PUBLICATIONS

Weidenhagen and Rienacker, *Berichte der Deutschen Chemischen Gesellschaft*, pp. 57–67 (1939).
Abstract No. 28867g of *Nippon Kagaku Zasshi*, 89(9) pp. 868–872 (1968), Sawa, Natsuo (Toho Rayon Co., Tokushima, Japan).

*Primary Examiner*—Melvyn I. Marquis
*Assistant Examiner*—Frederick Krass
*Attorney, Agent, or Firm*—Jack H. Park; Kenneth R. Priem; Russell R. Stolle

[57] ABSTRACT

An epoxy resin curative composition that provides cured epoxy resins exhibiting improved properties is disclosed. The curative composition comprises a mixture of 1-isopropyl-2-aryl imidazole and 1-isopropyl-2-aryl imidazoline.

10 Claims, No Drawings

MIXTURES OF 1-ISOPROPYL-2-ARYL IMIDAZOLE AND 1-ISOPROPYL-2-ARYL IMIDAZOLINE AS EPOXY RESIN CURATIVES

FIELD OF THE INVENTION

This invention relates to epoxy resin curing agents. More particularly, this invention relates to the use of a mixture of 1-isopropyl-2-aryl imidazole and 1-isopropyl-2-aryl imidazoline to cure a variety of epoxy resins.

BACKGROUND OF THE INVENTION

Epoxy resins include a broad class of polymeric materials having a wide range of physical properties. The resins are characterized by epoxide groups, which are cured by reaction with certain catalysts or curing agents to provide cured epoxy resin compositions with various desirable properties. The most common epoxy resins are condensation products of epichlorohydrin and bisphenol A.

It is known to use substituted imidazoles as curing agents for epoxy resins. Co-assigned U.S. Pat. No. 4,931,528, for example, discloses the use of 1-isopropyl-2-methyl imidazole to cure epoxy resins. Japanese Patent No. 63,308,030, to Koei Chem. Ind. KK, discloses an epoxy resin hardener containing 1-alkyl-2-phenyl imidazole. An abstract of the Japanese patent names 1-propyl-2-phenyl imidazole in a list of suitable imidazole curing agents. The imidazole is said to be prepared by dehydrating N-alkyl-ethylene diamine and a nitrile in the presence of a dehydrating catalyst.

Other methods are known for the preparation of imidazoles. In one process, imidazoles are prepared from imidazolines by dehydrogenation of imidazolines over a catalyst comprising nickel in combination with a transition metal, preferably copper and/or chromium. See, for example, co-assigned U.S. Pat. No. 4,927,942, hereby incorporated by reference. Before the discovery of the present invention, it was thought desirable to obtain an essentially quantitative yield of imidazole from a corresponding imidazoline, and to use the essentially imidazoline-free imidazole as the curing agent. Surprisingly, however, Applicants have now discovered that a mixture of 1-isopropyl-2-aryl imidazole and 1-isopropyl-2-aryl imidazoline can be employed as an epoxy resin curative to provide epoxy resins having improved properties. Whereas it was previously thought desirable to dehydrogenate all the imidazoline to imidazole, applicants have discovered, surprisingly, that the presence of a significant amount of imidazoline actually improves the properties of the curative. Additionally, the less strenuous dehydrogenation conditions necessary to obtain the mixture of imidazoline and imidazole make this new curative economically attractive.

SUMMARY OF THE INVENTION

The invention relates to an epoxy resin curative composition, comprising a mixture of 1-isopropyl-2-aryl imidazole and 1-isopropyl-2-aryl imidazoline, in which from about 5 to about 50 wt. % of the mixture is 1-isopropyl-2-aryl imidazoline. In another of its aspects, the invention relates to a method for curing an epoxy resin, comprising combining (1) from about 1 to about 5 parts by weight of a mixture of 1-isopropyl-2-aryl imidazole and 1-isopropyl-2-aryl imidazoline, in which from about 5 to about 50 wt. % of the mixture is 1-isopropyl-2-aryl imidazoline, and (2) about 100 parts by weight of an epoxy resin. The invention also relates to a method for curing an epoxy resin, comprising combining (1) from about 1 to about 5 parts by weight of a mixture of 1-isopropyl-2-phenyl imidazole and 1-isopropyl-2-phenyl imidazoline, in which from about 10 to about 25 wt. % of the mixture is 1-isopropyl-2-phenyl imidazoline, and (2) about 100 parts by weight of an epoxy resin.

DESCRIPTION OF THE PREFERRED EMBODIMENTS

The imidazole component of the curative composition of the present invention is a member of a group of imidazoles having the following general formula:

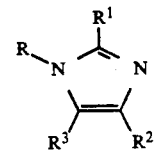

in which R is H or an alkyl group containing 1 to 18 carbon atoms, $R^1$ is an aryl group, $R^2$ is H or an alkyl group containing 1 to 4 carbon atoms, and $R^3$ is H or an alkyl group containing 1 to 4 carbon atoms.

Applicants have discovered that a blend or mixture of 1-isopropyl-2-aryl imidazole and 1-isopropyl-2-aryl imidazoline surprisingly provides a cured epoxy resin which demonstrates properties that make the mixture particularly valuable as a curing agent. Preferably, the mixture contains from about 5 to about 50 wt. % 1-isopropyl-2-aryl imidazoline. More preferably, the mixture contains from about 5 to about 30 wt. % 1-isopropyl-2-aryl imidazoline. It is especially preferred that the mixture contain from about 10 to about 25 wt. % 1-isopropyl-2-aryl imidazoline.

The structure of the preferred imidazole component, 1-isopropyl-2-phenyl imidazole, may be represented as follows:

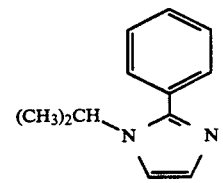

The structure of the preferred imidazoline component, 1-isopropyl-2-phenyl imidazoline, may be represented as follows:

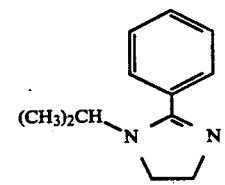

The 1-isopropyl-2-aryl imidazole component of the instant invention may be prepared by a method comprising dehydrogenation of 1-isopropyl-2-aryl imidazoline over a catalyst comprising (1) nickel and (2) from about 2 to 30 wt. % copper and/or chromium, i.e. copper or chromium alone or in combination with the other, at a temperature of about 160° C. to about 250° C.

and a pressure of about atmospheric to about 200 psig. By adjusting the process conditions of the dehydrogenation procedure, mixtures of imidazole and imidazoline may be obtained exhibiting various weight ratios of the two components. For example, by lowering the temperature of the dehydrogenation reaction, a mixture will be obtained with a greater proportion of the imidazoline component. Various mixtures may be produced by manipulating the conditions of the process disclosed in co-assigned U.S. Pat. No. 4,927,942, incorporated herein by reference. Alternatively, the imidazole and imidazoline components may be obtained by separate processes, and then blended together to obtain the mixtures of the present invention. The imidazole may be obtained, for example, by the method disclosed in co-assigned U.S. Pat. No. 4,921,969, hereby incorporated by reference. The imidazoline used in the present invention may be obtained by the well-known reaction of an organic acid and a diamine.

Generally, the vicinal polyepoxide-containing compositions that may be cured with the curative mixtures of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide-containing compounds typically are of an epoxy equivalent weight (EEW) of about 150 to about 250. Preferably, the polyepoxide-containing compounds have an epoxy equivalent weight of about 170 to about 220. More preferably, the base resin, which has an epoxide equivalent weight of from 175 to 195, is derived by condensing epichlorohydrin with 2,2-bis(p-hydroxyphenyl propane) to form the bis-epoxide derivative of bisphenol A. After condensation is complete, the crude resin is freed of residual epichlorohydrin, washed well to remove salt and soluble by-products, and recovered.

Preferred polyepoxides are those of glycidyl ethers prepared by epoxidizing the corresponding allyl ethers or by reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin and the like, with either a polyhydric phenol or a polyhydric alcohol. Typically the epoxy resins have an average of at least 1.8 reactive, 1,2-epoxy groups per molecule. An illustrative, but by no means exhaustive, list of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may be co-reacted with an epihalohydrin to provide these epoxy polyethers are such compounds as resorcinol, hydroquinone, substituted hydroquinones, e.g. methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl) dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like; polyallyl alcohol; polyhydric thioethers, such as 2,2'- or 3,3'-tetrahydroxydipropylsulfide and the like; mercapto alcohols such as monothio glycerol, dithio glycerol and the like; polyhydric alcohol partial esters, such as monostearin, pentaerythritol monoacetate and the like; and halogenated polyhydric alcohols, such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

Those skilled in the art will appreciate that the polyepoxide compositions which are useful according to the practice of the present invention are not limited to those containing the above described polyepoxides, but that these polyepoxides are provided here merely as being representative of the class of polyepoxides as a whole.

A novel curative composition of the present invention should be present in the epoxy resin in an amount sufficient to provide 1 to 5 parts by weight (pbw) of the 1-isopropyl-2-aryl imidazole/ 1-isopropyl-2-aryl imidazoline mixture per 100 parts by weight epoxy resin. The curative compositions of the present invention may be combined with the epoxy resin at ambient temperature. Preferably, after combining the curative composition and the epoxy resin, the epoxy resin is heated to a temperature of about 125° C. to about 250° C. for about 1 to about 36 hours. The novel method of this invention is further illustrated in the examples that follow. The method of curing epoxy resins with the curing compositions of the present invention allows for the production of compositions with properties permitting a variety of applications. Properties that may be obtained by variations of the invention are demonstrated in the examples.

In the examples, the following properties were measured:

Shore D hardness - (ASTM D-2240—81) Measures, at 0 and at 10 seconds, indentation hardness with durometer.

HDT - (ASTM D) Heat distortion temperature is the temperature at which a polymer sample distorts under load upon heating under specified conditions. HDT's also may be used to indicate the degree of cross-linking or extent of cure of an epoxy resin.

Izod Impact Strength (ft-lb/in) - Izod impact testing is carried out with a pendulum-type device. The test specimen is positioned as a cantilever beam with the notched side facing the striker. Five samples are tested for impact with each formulation, the average being recorded as Izod impact strength.

Tensile Strength, psi - The rupture strength (stress applied at break) per unit area of material subjected to a specified dynamic load. "Ultimate tensile strength" is the force, at break, when a sample is pulled apart.

Tensile Modulus, psi - Stress/strain

Flexural Strength, psi - A measure of the ability of a material to withstand failure due to bending.

Flexural modulus, psi - Stress/strain

The invention will be further illustrated by the following examples, which are given by way of illustration and not as limitations on the scope of this invention. The entire text of every patent, patent application or other reference mentioned above is hereby incorporated herein by reference.

EXAMPLES
Properties: Epoxy Resin Cured with 1-Isopropyl-2-Aryl Imidazole vs. Epoxy Resin Cured with Mixture of 1-Isopropyl-2-Aryl Imidazole/1-Isopropyl-2-Aryl Imidazoline

| Formulation | 1 | 2 | 3 | 4 |
|---|---|---|---|---|
| Liquid Epoxy Resin[1] | 100 pbw | 100 pbw | 100 pbw | 100 pbw |
| 1-isopropyl-2-phenyl imidazole[2] | 2.0 pbw | 1.8 pbw | 1.6 pbw | 1.4 pbw |
| 1-isopropyl-2-phenyl imidazoline | — | 0.2 pbw | 0.4 pbw | 0.6 pbw |
| Properties of Cured ⅛ inch Castings[3] | | | | |
| Shore D Hardness (0-10 sec.) | 89-81 | 95-92 | 92-89 | 94-91 |
| HDT, °C. @ 264 psi | 183.81 | 238.3 | 238.3 | 178.5 |
| Izod Impact Strength, ft-lb/in | 0.03 | 0.08 | 0.10 | 0.08 |
| Tensile Strength, psi | 3200 | 2800 | 1700 | 2400 |
| Tensile Modulus, psi | 393000 | 451000 | 424000 | 465000 |
| Elongation at Break, % | 0.9 | 0.7 | 0.4 | 0.6 |
| Flexural Strength, psi | 5950 | 4600 | 4400 | 5000 |
| Flexural Modulus, psi | 349000 | 375000 | 370000 | 375000 |
| Percent Weight Gain, 24 hr. water boil | 1.12 | 0.90 | 0.88 | 0.88 |
| Percent Weight Gain, 3 hr. acetone boil | −0.03[4] | −0.03[4] | −0.05[4] | −0.03[4] |

[1]EEW ≈ 185
[2]Purity ≈ 99%.
[3]Cured two hours @ 100° C. and four hours @ 210° C.
[4]Slight weight loss noted.

Among the properties improved by the use of the imidazole/imidazoline mixture of the present invention, especially noteworthy is the surprising increase in heat distortion temperature (HDT) obtained in formulations 2 and 3, as compared with the heat distortion temperature of the resin cured with the essentially pure imidazole (formulation 1).

We claim:

1. A method for curing an epoxy resin, comprising combining (1) from about 1 to about 5 parts by weight of a mixture of 1-isopropyl-2-aryl imidazole and 1-isopropyl-2-aryl imidazoline, in which from about 5 to about 50 wt. % of the mixture is 1-isopropyl-2-aryl imidazoline, and (2) about 100 parts by weight of an epoxy resin.

2. The method of claim 1, in which from about 5 to about 30 wt. % of the mixture is 1-isopropyl-2-aryl imidazoline.

3. The method of claim 1, in which from about 10 to about 25 wt. % of the mixture is 1-isopropyl-2aryl imidazoline.

4. The method of claim 1, in which the 1-isopropyl-2-aryl imidazole is 1-isopropyl-2-phenyl imidazole and in which the 1-isopropyl-2-aryl imidazoline is 1-isopropyl-2-phenyl imidazoline.

5. The method of claim 4, in which from about 5 to about 30 wt. % of the mixture is 1-isopropyl-2-phenyl imidazoline.

6. The method of claim 1, in which the epoxy resin is a diglycidyl ether of bisphenol A, having an epoxy equivalent weight of from about 170 to about 220.

7. The method of claim 1, further comprising the second step of heating the epoxy resin to a temperature of about 125° C. to about 250° C. for about 1 to about 36 hours.

8. A method for curing an epoxy resin, comprising combining (1) from about 1 to about 5 parts by weight of a mixture of 1-isopropyl-2-phenyl imidazole and 1-isopropyl-2-phenyl imidazoline, in which from about 10 to about 25 wt. % of the mixture is 1-isopropyl-2-phenyl imidazoline, and (2) about 100 parts by weight of an epoxy resin.

9. The method of claim 8, in which the epoxy resin is a diglycidyl ether of bisphenol A, having an epoxy equivalent weight of from about 170 to about 220.

10. The method of claim 8, further comprising the second step of heating the epoxy resin to a temperature of about 125° C. to about 250° C. for about 1 to about 36 hours.

* * * * *